United States Patent
Suzuki et al.

(10) Patent No.: US 7,881,344 B2
(45) Date of Patent: Feb. 1, 2011

(54) COMMUNICATION NETWORK SYSTEM AND WAKEUP METHOD FOR UN-WAKEUP NODE

(75) Inventors: Atsuya Suzuki, Tokyo (JP); Kazunori Morimoto, Ebina (JP)

(73) Assignee: Nissan Motor Co., Ltd., Yokohama-shi, Kanagawa ( * ) Notice: Subject to any disclaimer, the term of this patent is extended or adjusted under 35 U.S.C. 154(b) by 833 days.

(21) Appl. No.: 11/774,694

(22) Filed: Jul. 9, 2007

(65) Prior Publication Data
US 2008/0008103 A1 Jan. 10, 2008

(30) Foreign Application Priority Data
Jul. 10, 2006 (JP) .............................. 2006-189676
Jun. 13, 2007 (JP) .............................. 2007-156701

(51) Int. Cl.
*H04J 3/06* (2006.01)

(52) U.S. Cl. ..................................... 370/503; 370/250

(58) Field of Classification Search ................. 370/250, 370/503
See application file for complete search history.

(56) References Cited

U.S. PATENT DOCUMENTS

| 2004/0081079 | A1 | 4/2004 | Forest et al. | |
| 2005/0129038 | A1 | 6/2005 | Hall et al. | |
| 2005/0141565 | A1* | 6/2005 | Forest et al. | 370/503 |
| 2006/0292987 | A1* | 12/2006 | Ophir et al. | 455/41.2 |

OTHER PUBLICATIONS

"FlexRay Communication System Protocol Specification, Version 2.1, Revision A", Dec. 2005, pp. 142-152.

* cited by examiner

*Primary Examiner*—Derrick W Ferris
*Assistant Examiner*—Christopher R Crompton
(74) *Attorney, Agent, or Firm*—Young Basile

(57) ABSTRACT

A vehicular network communication apparatus and method detects and wakes up a sleeping network node through transmission of a pseudo-wakeup signal after an initial wake up fails for one or more nodes in a network.

19 Claims, 6 Drawing Sheets

COMMUNICATION NETWORK SYSTEM AND WAKEUP METHOD FOR UN-WAKEUP NODE

CROSS-REFERENCE TO RELATED APPLICATION

This application claims priority from Japanese Patent Application Serial No. 2006-189676, filed on Jul. 10, 2006, and Japanese Patent Application Serial No. 2007-156701, filed on Jun. 13, 2007, each of which is incorporated herein in its entirety by reference.

TECHNICAL FIELD

The present invention relates in general to a communication network system and a wakeup method for a sleeping node in the communication network system.

BACKGROUND

Known electronic communication protocols such as CAN (Control Area Network) are used as a global standard for in-vehicle networking for performing various types of automotive control. This protocol has exhibited performance limitations. With future emphasis on safety and passenger comfort, a more complex and sophisticated protocol is needed.

An electronic communication protocol called "FlexRay" (registered trademark of DaimlerChrysler AG) is an advanced type of protocol for a communication network system installed in a vehicle. FlexRay realizes a communication speed of a maximum of approximately 10 Mbps (megabits per second), while ensuring high reliability. FlexRay has attracted attention as an important technology for practicing electronic control (X-by-wire) of a mechanical portion or device related to vehicle running, for example, steer-by-wire or brake-by-wire systems.

BRIEF SUMMARY

Various embodiments of the invention are described herein. One embodiment includes a communication network system for performing time-division-multiplexing communication in a communication cycle including a data transfer period and an idle period. The communication network system comprises a network including a plurality of nodes, an un-wakeup-node detecting unit connected to the network and configured to detect a second node of the plurality of nodes that remains in a sleep state following transmission of a wakeup signal from a first node of the plurality of nodes, and a pseudo-wakeup-signal transmitting unit connected to the network and configured to transmit a pseudo-wakeup signal to the network during at least one idle period to wake up the second node from the sleep state after the un-wakeup-node detecting unit detects that the second node remains in the sleep state.

BRIEF DESCRIPTION OF THE DRAWINGS

The description herein males reference to the accompanying drawings wherein like reference numerals refer to like parts throughout the several views, and wherein.

DETAILED DESCRIPTION OF EMBODIMENTS OF THE INVENTION

In known vehicular communication networks employing "FlexRay" as a communication protocol, after a wakeup process for waking up nodes on a network and a startup process for preparing communication are performed, a normal state in which each node can perform normal communication is activated and frames are transmitted and received among the nodes in time-division multiplexing for each communication cycle.

The known wakeup process in FlexRay is performed as follows. First, among the nodes on the network, one node is woken up by an internal event based on, for example, an operation by a user activating a switch, or the like. The node woken up by the internal event sends a wakeup signal having a particular pattern to a communication bus. At this time, the other network nodes are in a sleep state and can only receive the wakeup signal having the particular pattern. After a first node is woken up by the internal event, the first node sends out the wakeup signal and the other nodes receive the wakeup signal. After receiving the wakeup signal, the other nodes are woken up from the sleep state and join the network. This completes the wakeup process, and the startup process is subsequently performed. Details of the wakeup process in FlexRay are described in, for example, "FlexRay Communication System Protocol Specification, Version 2.1, Revision A", December 2005, pages 142-152.

However, when a situation such as noise contamination or a voltage drop temporarily occurs in a part of the nodes on the network while the wakeup process is being performed, and one or more nodes are not woken-up, existing FlexRay systems do not provide a feature or resending function for the non-activated still sleeping nodes to return and join the network. Accordingly, in order for the node in the sleep state, that is, the node (un-wakeup node) that has not been woken up yet to join the network, it is necessary to reattempt the wakeup process, which is complicated.

An example of a communication network system that employs FlexRay as a communication protocol and to which an embodiment of the invention is applied is described below. As described above, in the communication network system employing FlexRay as the communication protocol, a one-time wakeup process for waking up nodes on a network is performed as a process at the start of the system.

The communication network system taught herein has a feature wherein, among the nodes on the network, a first node has a function of; after already waking up and establishing communication with another node, waking up a second node (un-wakeup node) that has remained in the sleep state and not joined the network although the initial wakeup signal has already been sent.

Figure 1:
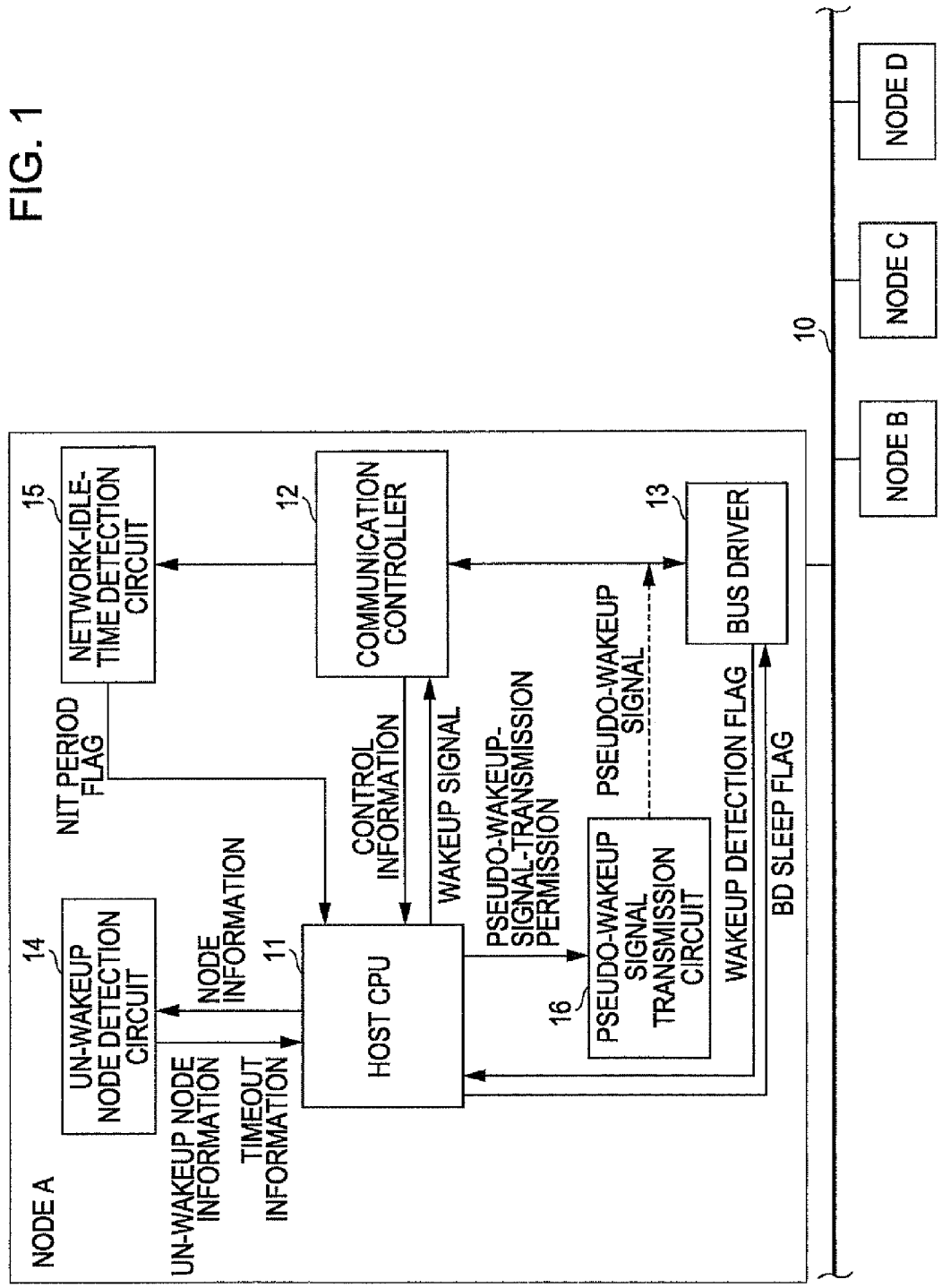
FIG. 1 is a schematic diagram showing the configuration of a communication network system to which an embodiment of the invention is applied.

FIG. 1 shows the configuration of one communication network system in which embodiments of the invention can be used. The communication network system includes four nodes A, B, C and D on the network by example. Each of the nodes may also be called an electronic control unit (ECU). The nodes A to D are connected to a communication bus 10.

For exemplary purposes only, node A, or the first node, is used to detect whether a hazard switch has been turned on. Node B is used to turn on a headlight. Node C is used to allow a meter to display various states. Node D is used to actually turn on a hazard flasher. Nodes A to D do not separately operate but consecutively operate on the basis of an operation of a predetermined node (for example, node A). In the FlexRay communication network system, communication is established after the wakeup process and startup process at the start of the system. Then, frames are transmitted and received for each communication cycle in time-trigger communication, also called time-division multiplexing, among nodes A to D in accordance with a predetermined schedule.

Figure 2:
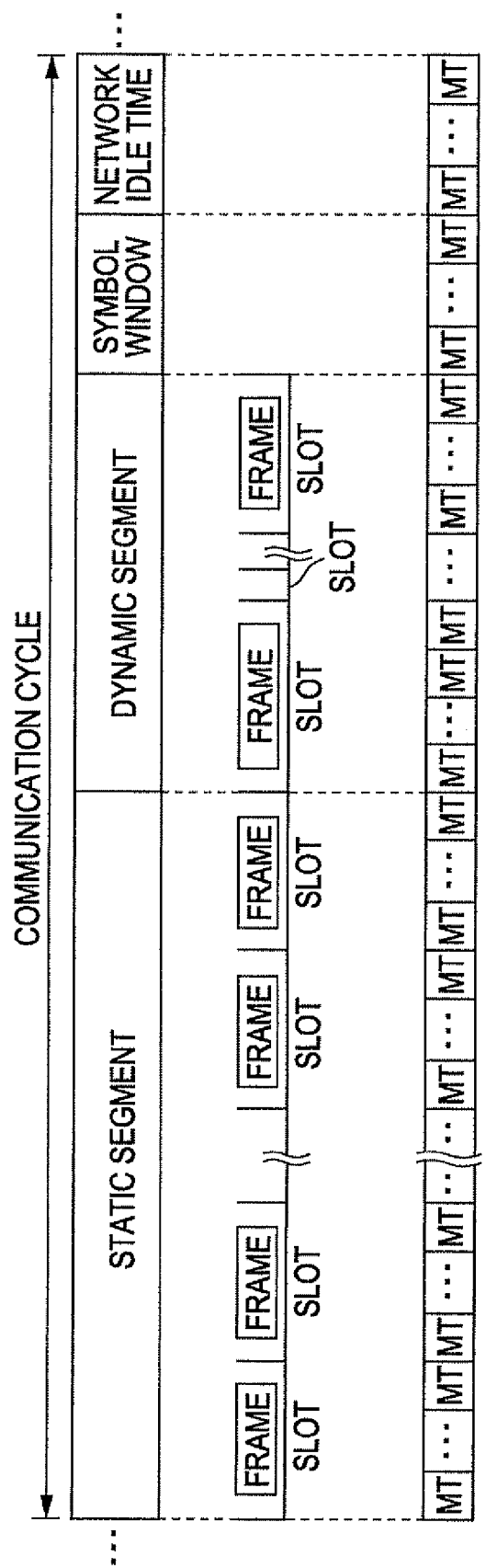
FIG. 2 is an exemplary illustration of a communication cycle in the FlexRay communication protocol.

As shown in FIG. 2, the communication cycle includes four segments, that is, a static segment, a dynamic segment, a symbol window and a network idle time.

The static segment is a period in which data transfer is performed with a constant frame size. The dynamic segment is a period in which data transfer is also performed with a variable frame size. In each of the static segment and the dynamic segments, slots that are time intervals for transmitting one frame are set. Each node of nodes A to D sends a frame including application data of the node to the communication bus 10 in slots assigned to the node. The static segment is a segment for confirming normality of a function (bus guardian) of monitoring frame-sending timing of the node.

The network idle time is a period necessarily provided for each communication cycle, and which is normally a segment for use in error correction and calculation of a synchronization correcting value of clock synchronization. In particular, in the communication network system according to the embodiment, one of nodes A to D uses the network idle time also as a segment for sending a pseudo-wakeup signal (described later) to the communication bus 10. The above static segment and network idle time are necessarily provided in the communication cycle. However, the above dynamic segment and symbol window are set as options. Accordingly, the need to use the above dynamic segment and symbol window can be eliminated depending on a configuration and use of the communication network system.

The communication cycle is set to have a length represented by an integral multiple of a time unit called a "Macrotick" (MT). In addition, the size of each of the four segments in the communication cycle is set beforehand in design to have a length represented by an integral multiple of a Macrotick. On the basis of Macroticks, nodes A to D on the network recognize a system global time that is common to the network and communicate with one another while performing synchronization in accordance with the global time.

Returning again to the communication network system shown in FIG. 1, in a commonly used internal configuration each of nodes A to D includes a host CPU (central processing unit) 11, a communication controller 12 and a bus driver 13. The host CPU 11 controls the communication controller 12 and controls exchange of data transmitted and received from the communication bus 10. The communication controller 12 has functions of converting data transmitted and received from the host CPU 11 into a predetermined communication format and passing communication data from the communication bus 10 to the host CPU 11 on the basis of a predetermined communication format. The bus driver 13 performs conversion between a voltage level and a logic level in order for data handled by the communication controller 12 to be transmitted and received on the communication bus 10. In this example, although FIG. 1 only shows an internal configuration for node A, each of nodes B, C and D also includes the host CPU 11, the communication controller 12 and the bus driver 13.

In addition, the communication network system includes, among nodes A to D, at least one node (here the first node) having an un-walkup or sleeping node detection circuit 14, a network-idle-time detection circuit 15 and a pseudo-wakeup signal transmission circuit 16. These circuits can be implemented in hardware, software or a combination thereto. The un-wakeup node detection circuit 14 detects a second node that remains in the sleep state (un-wakeup node) that has not joined the network due to not having woken up or changed to a communication state at the start of the system. The network-idle-time detection circuit 15 detects the network idle time (period) in the above-described communication cycle. The pseudo-wakeup signal transmission circuit 16 sends to the communication bus 10, as the pseudo-wakeup signal, a signal substantially identical in pattern to the wakeup signal transmitted by the communication controller 12 in the wakeup process at the start of the system. The pseudo-wakeup signal can also be a different signal that the initial wakeup signal.

FIG. 1 shows an example in which first node A includes the un-wakeup node detection circuit 14, the network-idle-time detection circuit 15 and the pseudo-wakeup signal transmission circuit 16. The un-wakeup node detection circuit 14, the network-idle-time detection circuit 15 and the pseudo-wakeup signal transmission circuit 16 may be provided in a node different from node A and may be provided in each of nodes A to D.

By exemplifying a case in which first node A is a node that is woken up by an internal event, and the un-wakeup node detection circuit 14, the network-idle-time detection circuit 15 and the pseudo-wakeup signal transmission circuit 16 are included in first node A, operations of portions related to embodiments of the invention are specifically described.

Situations in which a node in the sleep state is woken up include, for example, a situation in which a hazard flasher is turned on with the vehicle engine stopped (i.e., with the engine key turned off). It is understood that other vehicle functions and processes may be applied without departing from the invention embodiments.

Referring to FIG. 1, first, when the communication bus 10 is asleep before the system is started, in each of nodes A to D, the bus driver 13 is put into a sleep state such that a BD sleep flag of the bus driver 13 is set to be on by the host CPU 11, whereby a reduction in power consumption of the entire system is achieved. While the bus driver 13 is asleep, any signal on the communication bus 10 different from the wakeup signal having a particular pattern is not transferred from the bus driver 13 to the communication controller 12.

In this case, for example, when a user operates a vehicular switch (for example, a hazard flasher switch), this generates an internal event (first node A itself detects that the hazard flasher switch has been turned on) for waking up first node A (i.e., the node that detects whether the hazard flasher switch has been turned on), the host CPU 11 of first node A releases the bus driver 13 from the sleep state by turning off the BD sleep flag of the bus driver 13. After that, the host CPU 11 of node A turns on a wakeup signal flag of the communication controller 12.

Figure 3:
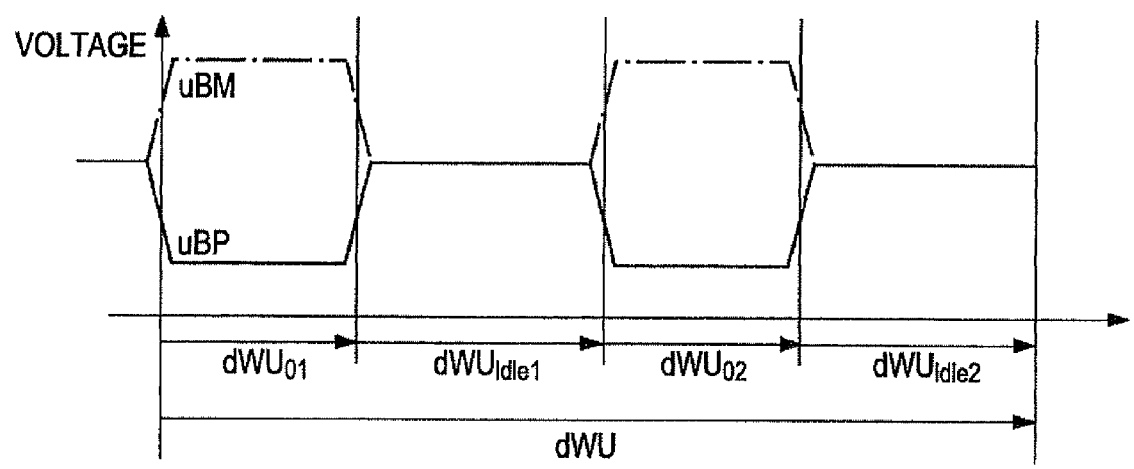
FIG. 3 is a graph showing a pattern of a wakeup signal.

When the wakeup signal flag enters an on-state, the communication controller 12 controls the bus driver 13 to send a wakeup signal having a particular pattern as shown in, for example, FIG. 3. The bus driver 13 sends the wakeup signal shown in FIG. 3 by converting the wakeup signal transferred from the communication controller 12 from a logic level into a voltage level and driving the communication bus 10. The wakeup signal can be transmitted only once at a stage before the communication cycle shown in FIG. 2 is generated.

At this time, each bus driver 13 of nodes B, C and D is asleep, but the wakeup signal having a particular pattern can be detected. When detecting a wakeup signal sent from first node A to the communication bus 10, the bus driver 13 turns on a wakeup detection flag of each host CPU 11.

The host CPU 11 releases the bus driver 13 from the sleep state by detecting that the wakeup signal has been sent to the communication bus 10 based on turning on of the wakeup detection flag and turning off of the BD sleep flag of the bus driver 13. This allows nodes B, C and D to join the network so that the function of each communication controller 12 enables communication. For joining the network, when one of nodes B to D (for example, node C) first receives the wakeup signal sent from node A to the communication bus 10, nodes A and C establish synchronization in the network idle time of the communication cycle, and the next node performs communication by similarly establishing synchronization. That is, to join the network at least two nodes need to establish synchronization.

It is assumed for exemplary purposes here that when the wakeup signal is sent from first node A to the communication bus 10, a node has some factor that hinders wakeup signal detection, such as temporary noise contamination, a variation in power-supply voltage or a temperature change. If, for example, node D (node for activating the hazard flasher), referred to as second node D, has such a factor, the bus driver 13 of second node D cannot detect the wakeup signal sent from node A and thus remains in the sleep state. In this case, the host CPU 11 of second node D cannot detect that the wakeup signal has been sent to the communication bus 10 since the wakeup detection flag remains off. Accordingly, the BD sleep flag of the bus driver 13 remains on, and the sleep state of the bus driver 13 continues although the wakeup signal has been sent from first node A to the communication bus 10. Second node D remains in the sleep state and cannot join the network. In other words, if node D for activating the hazard flasher does not join the network in association with the operation of node A, which detects that the hazard flasher switch has been operated, the hazard flasher itself is not activated.

In this case, after the wakeup process and the startup process are performed to establish communication, one of the nodes on the network (first node A in this example) detects the existence of a still-sleeping or un-wakeup node (second node D in this example) that cannot join the network due to no wakeup in the wakeup process. In a network idle time that is an idle period in the communication cycle, a pseudo-wakeup signal substantially identical in pattern to the wakeup signal is sent to the communication bus 10, whereby the un-wakeup node is woken up to join the network after the communication is established.

Specifically, after the wakeup process and startup process at the start of the system are performed to establish communication, while first node A is communicating with a different node with the static segment and dynamic segment in the communication cycle, the un-wakeup node detection circuit 14 determines whether a un-wakeup node is detected. For example, it is assumed that by transmitting a wakeup signal from first node A, which detects that the hazard flasher switch has been operated, node C for allowing the meter to display an activation state of the hazard flasher, which receives the wakeup signal, establishes communication. The un-wakeup node detection circuit 14 stores in its internal memory information of nodes that should join the network, that is, in this example, information indicating that nodes B, C and D exist on the network and that first node A should receive frames that are transmitted from nodes B, C and D. When the un-wakeup node detection circuit 14 initiates communication with a different node and receives frames sent from the different node in the static segment and dynamic segment in the communication cycle, and the host CPU 11 reports to the un-wakeup node detection circuit 14 node information indicating from which node the frames have been received, the un-wakeup node detection circuit 14 compares the reported node information with the information stored in the internal memory. Depending on whether the un-wakeup node detection circuit 14 has received frames from a node that should join the network, the un-wakeup node detection circuit 14 determines whether a still sleeping second node (un-wakeup node) that cannot join the network exists. When detecting the still sleeping second node (un-wakeup node), the un-wakeup node detection circuit 14 reports detection information to the host CPU 11.

In this exemplary embodiment, in the wakeup process at the start of the system second node D is not woken up and has not joined the network. In the static segment and dynamic segment in the communication cycle, no frames (data) are transmitted from second node D. Therefore, by comparing the information reported from the host CPU 11 with the information stored in the internal memory, the un-wakeup node detection circuit 14 of the first node A detects the existence of sleeping second node D as an un-wakeup node that has not joined the network and reports the detection as un-wakeup node information to the host CPU 11.

In addition, the network-idle-time detection circuit 15 of first node A detects the network idle time that is an idle period in the communication cycle. As described above, each of the communication cycle and the network idle time therein is based on time units called Macroticks and is set to be an integral multiple of a Macrotick. Start timing of the network idle time in the communication cycle is set beforehand. The network-idle-time (NIT) detection circuit 15 stores the number of Macroticks from the beginning of the communication cycle to the start timing of the network idle time and the number of Macroticks up to the end of the network idle time. Whenever the network-idle-time detection circuit 15 receives a reported interruption for each Macrotick after the communication controller 12 reports the start of the communication cycle to the network-idle-time detection circuit 15, the network-idle-time detection circuit 15 counts the number of Macroticks and compares the counted number with the stored value, whereby the network-idle-time detection circuit 15 determines the start and end of the network idle time. During lapse of the network idle time, the network-idle-time detection circuit 15 turns on an NIT period flag of the host CPU 11 to report to the host CPU 11 that the network idle time is on.

After the un-wakeup node detection circuit 14 reports that the un-wakeup node exists, the host CPU 11 gives pseudo-wakeup-signal transmitting permission to the pseudo-wakeup signal transmission circuit 16 when the network-idle-time detection circuit 15 turns on the NIT period flag. After receiving the pseudo-wakeup-signal transmitting permission from the host CPU 11, the pseudo-wakeup signal transmission circuit 16 allows the bus driver 13 to transmit to the communication bus 10 a pseudo-wakeup signal substantially identical in pattern to, for example, the wakeup signal shown in FIG. 3. Specifically, although a line of a transmitting signal terminal (Txd) of the bus driver 13 is normally connected to only the communication controller 12, in the embodiments taught herein, a line of a transmitting signal terminal (Txd) of the bus driver 13 is connected to both the communication controller 12 and the pseudo-wakeup signal transmission circuit 16 via an OR circuit. When transmitting the pseudo-wakeup signal, the pseudo-wakeup signal transmission circuit 16 sends the pseudo-wakeup signal to the communication bus 10 by setting the transmitting signal terminal (Txd) to be in a low level in $dWU_{o1}$ and $dWU_{o2}$ periods shown in FIG. 3 and to be in a high level in $dWU_{Idle1}$ and $dWU_{Idle2}$ periods. The representation dWU represents one cycle of the pseudo-wakeup signal, and a distance between uBM and uBP represents an amplitude value (voltage). The reason that not the wakeup signal but the pseudo-wakeup signal is sent is that, as described above, the wakeup signal can be transmitted only once at a stage before the communication cycle shown in FIG. 2 is generated. After at least two nodes establish communication to start to communicate with each other in the communication cycle shown in FIG. 2, the wakeup signal itself cannot be physically sent.

Since the bus driver 13 remains asleep, second node D that has not joined the network due to no wakeup in the wakeup process at the start of the system cannot receive frames sent from a different node in the static segment and dynamic segment in the communication cycle. However, when the pseudo-wakeup signal identical in pattern to the wakeup signal is transmitted from first node A in the network idle time in the communication cycle, the bus driver 13 detects the transmitted wakeup signal and turns on the wakeup detection flag of the host CPU 11 similarly to the case of the wakeup process. When the wakeup detection flag is turned on, the host CPU 11 releases the bus driver 13 from the sleep state by turning off the BD sleep flag. This allows second node D to be joined in the network and to participate in communication by using the function of the communication controller 12 of second node D.

When first node A transmits the pseudo-wakeup signal by using the network idle time in the communication cycle, each communication controller 12 of nodes B and C, which have already joined the network, reports various types of information to the host CPU 11 on the basis of signal detection in the network idle time. In this case, the host CPU 11 does not perform control based on the various types of information reported from the communication controller 12. In other words, when the network idle time in the communication cycle is not idle, the host CPU 11 normally executes various processes such as an error process and an interruption process on the basis of the information from the communication controller 12. However, when the signal detected in the network idle time is the pseudo-wakeup signal, the above various processes, such as an error process and an interruption process, are unnecessary and will cause an increase in load on the host CPU 11. Accordingly, when the signal detected in the network idle time is the pseudo-wakeup signal, the host CPU 11 suppresses the load increase based on execution of unnecessary processing by performing no implementation of control based on the various types of information reported from the communication controller 12. Here, determination of whether the signal detected in the network idle time is the pseudo-wakeup signal can be performed such that the communication controller 12 compares the pattern of the detected signal with that of the wakeup signal. In addition, the determination can be performed such that, by providing each of nodes B and C with an un-wakeup node detection circuit 14, when the un-wakeup node detection circuit 14 detects the existence of the un-wakeup node, the signal detected in the network idle time is assumed to be the pseudo-wakeup signal.

Figure 4:
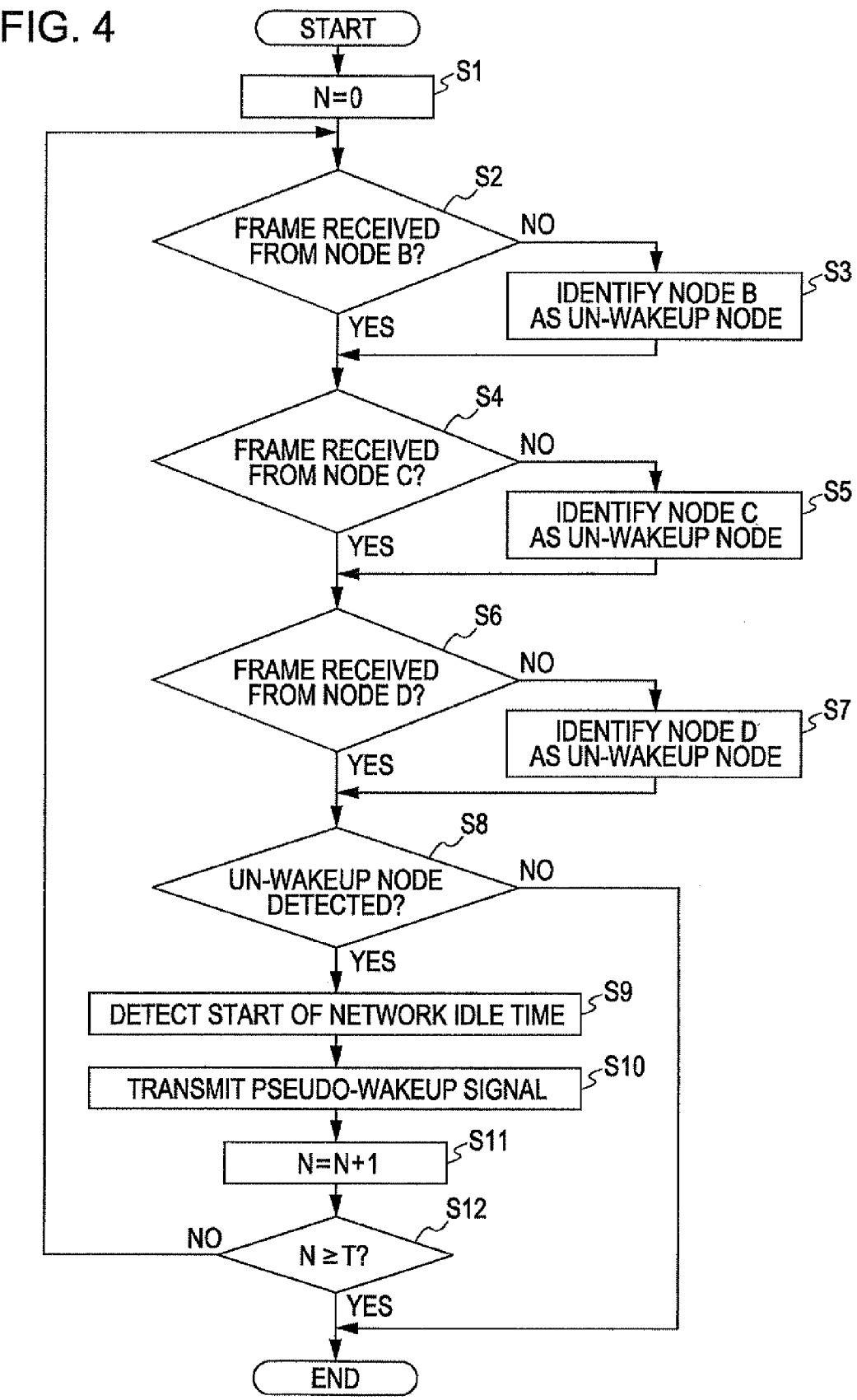
FIG. 4 is an exemplary flowchart showing where node A detects a sleeping (or un-wakeup) node and transmits a pseudo-wakeup signal to the sleeping node.

FIG. 4 is a flowchart showing a process in a case in which, after the wakeup process and startup process at the start of the system are performed to establish communication, node A detects an un-wakeup node and transmits a pseudo-wakeup signal to the un-wakeup node.

After the wakeup process and startup process at the start of the system are performed to establish communication, in step S1 counter N for counting the number of communication cycles is set to an initial value of zero by first node A. Next, in steps S2 to S7, node A determines whether an un-wakeup node that has not joined the network exists based on whether node A has received frames from nodes B, C and D in the static segment and dynamic segment in the communication cycle. Specifically, when first node A has not received any frames (data) from node B in response to a query in step S2, in step S3 node A identifies node B as a sleeping (un-wakeup) node. When first node A has not received any frames (data) from node C (if the response to the query in step 84 is negative), in step S5 node A identifies node C as a sleeping (un-wakeup) node. When first node A has not received any frames (data) from node D (in the event of a negative response to the query in step S6), in step S7 node A identifies node D as a sleeping (un-wakeup) node.

In step S8, first node A allows the process to branch off based on whether an un-wakeup node has been detected in any of steps S2 to S7. If a sleeping (un-wakeup) node has not been detected, the process finishes. If a sleeping (un-wakeup) node has been detected, the process proceeds to step S9.

In step S9 first node A detects the start of the network idle time in the communication cycle on the basis of the counted number of Macroticks from the beginning of the communication cycle. In this embodiment, first node A transmits the pseudo-wakeup signal identical in pattern to the wakeup signal in the network idle time at step S10. Again, the pseudo-wakeup signal may be a different signal than the wakeup signal.

In step S11 first node A increments the value of counter N for counting the number of communication cycles. In step S12 first node A determines whether the value of counter N has reached a predetermined number T (for example, three) of times a time out occurs. This number T of times the time out occurs is a limiter for limiting the number of times the pseudo-wakeup signal is transmitted. Number T of times the time out occurs is used to avoid a problem of an increase in processing load caused by continuous transmission of the pseudo-wakeup signal by first node A when a node that cannot be woken up by the pseudo-wakeup signal due to occurrence of malfunction or the like is detected as an un-wakeup node.

If it is determined in step S12 that the value of counter N has not reached number T of times the time out occurs, the process returns to step S2, where first node A repeatedly performs step S2 and the subsequent steps at the start of the next communication cycle. When the sleeping (un-wakeup) node is woken up to join the network by transmission of the pseudo-wakeup signal in the network idle time in the previous communication cycle, and no sleeping (un-wakeup) node is detected in steps S2 to S7, in step S8 it is determined that no sleeping (un-wakeup) node exists. Accordingly, the process finishes.

Alternatively, when a sleeping (un-wakeup) node is detected in steps S2 to S7 even though the pseudo-wakeup signal is transmitted, step S2 and the subsequent steps are repeatedly performed whenever the communication cycle passes until, in step S12, it is determined that the value of counter N has reached number T of times the time out occurs. If it is determined in step S12 that the value of counter N has reached number T of times the time out occurs, it is concluded that the sleeping (un-wakeup) node malfunctions. Accordingly, the process finishes in order to stop transmission of the pseudo-wakeup signal.

As described in detail by exemplifying a specific example, by providing at least one node among nodes A to D on the communication network system with the un-wakeup node detection circuit 14, the network-idle-time detection circuit 15 and the pseudo-wakeup signal transmission circuit 16, when a sleeping (un-wakeup) node that has not joined the network after establishment of communication due to no wakeup in the wakeup process at the start of the system, the network idle time that is an idle period in the communication cycle is used to transmit a pseudo-wakeup signal identical (or substantially identical) in pattern to a wakeup signal. Therefore, after communication is established the un-wakeup node can be woken up to join the network without system restart, and appropriate communication can be performed among all the nodes on the network.

The above-described exemplary communication network system is just one example to which the present invention can be applied. The technical scope of the invention is not limited to the above-disclosed contents, but obviously includes various alternate technologies that can be derived from the above-disclosed contents.

Figure 5:
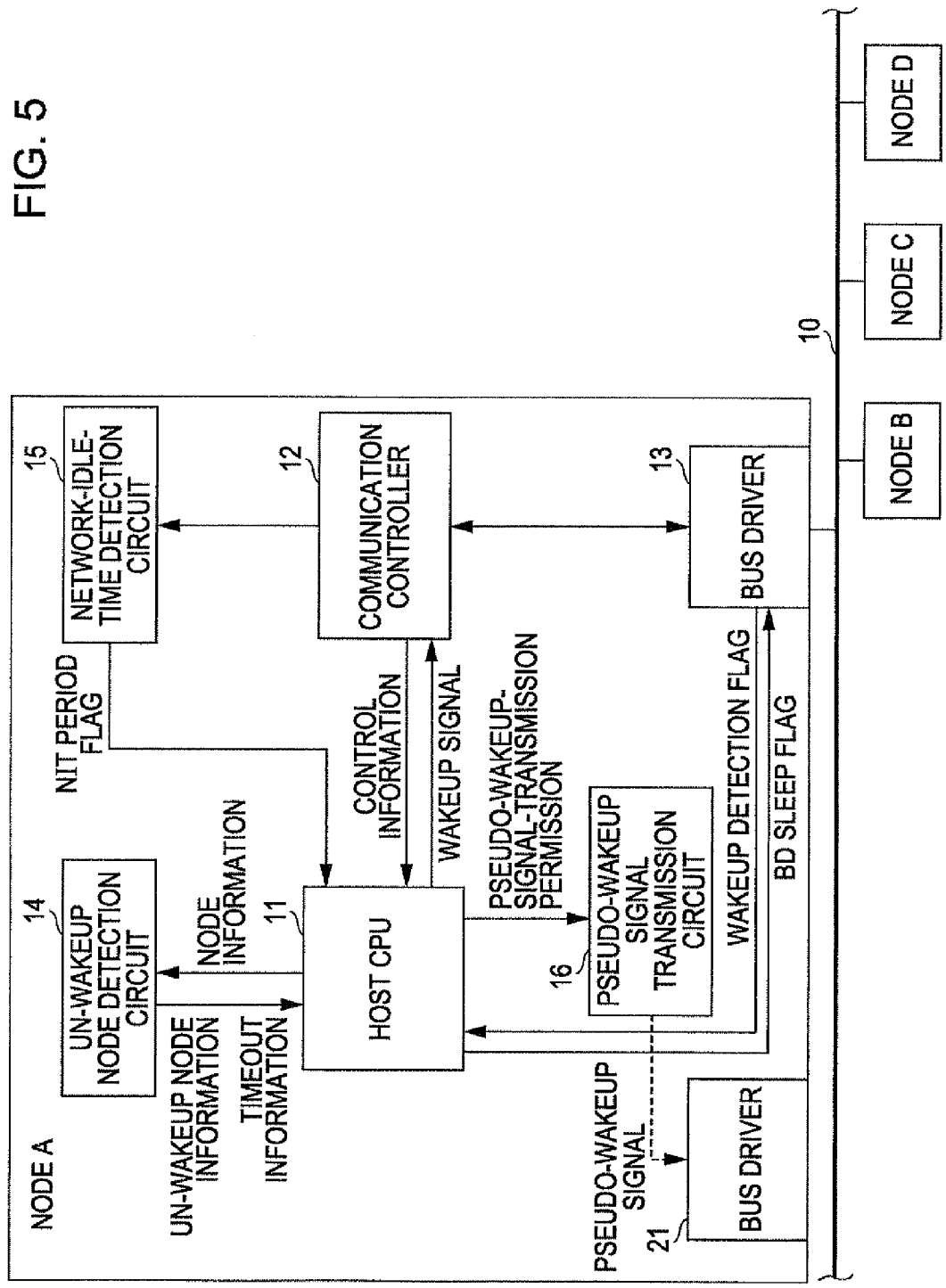
FIG. 5 is a schematic diagram showing another example of the configuration of the communication network system.
Figure 6:
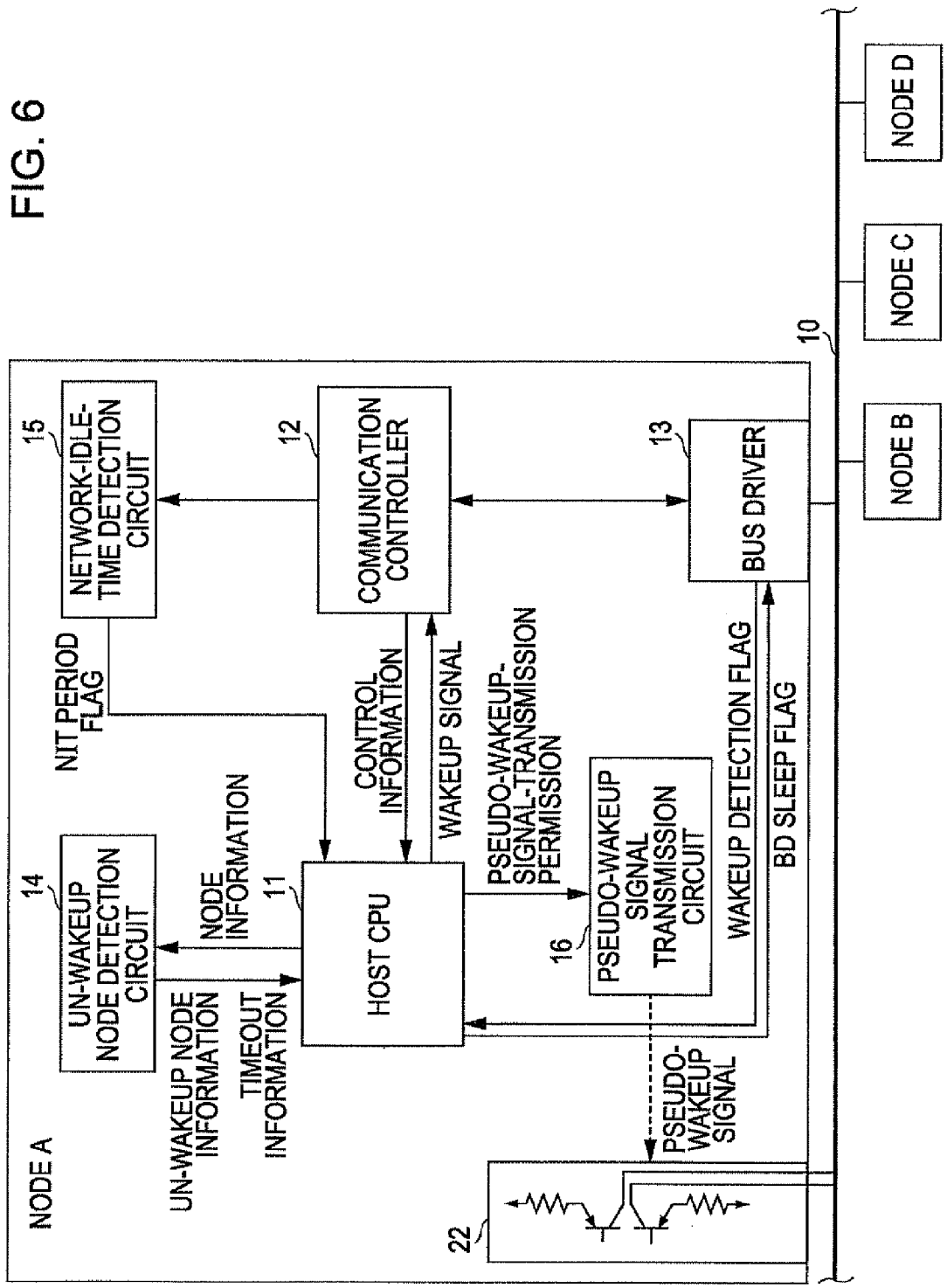
FIG. 6 is a schematic diagram showing a further example of the configuration of the communication network system.

For example, although the line of the transmitting signal terminal (Txd) connected from the communication controller 12 to the bus driver 13 is OR-connected to the pseudo-wakeup signal transmission circuit 16 in the example shown in FIG. 1, this is not necessary. For example, as shown in FIG. 5, by providing a dedicated bus driver 21 for transmitting the pseudo-wakeup signal and connecting the pseudo-wakeup signal transmission circuit 16 to the bus driver 21, the need to use the OR circuit can be eliminated in the configuration. As another example, by providing a dedicated transistor circuit 22 for transmitting the pseudo-wakeup signal and connecting the pseudo-wakeup signal transmission circuit 16 to the transistor circuit 22 as shown in FIG. 6, the need to use the OR circuit can be eliminated in the configuration.

In addition, the invention is not limited to a communication network system employing FlexRay as a communication protocol and can effectively be applied also to a communication network system employing a different protocol in which a node is woken up by receiving a wakeup signal having a particular pattern and performs communication at a cycle similar to the communication cycle in FlexRay.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A communication network system for performing time-division-multiplexing communication in a communication cycle including a data transfer period and an idle period, the communication network system comprising:
    a network including a plurality of nodes, a first node of the plurality of nodes configured to transmit a wakeup signal from the first node to at least two other nodes of the plurality of nodes and to start a communication cycle responsive to at least one of the plurality of nodes being woken up by the wakeup signal so as to be placed in a communication state, the communication cycle being a periodic cycle including the data transfer period and the idle period;
    an un-wakeup-node detecting unit connected to the network and configured to detect a second node of the plurality of nodes that remains in a sleep state following transmission of the wakeup signal;
    a pseudo-wakeup-signal transmitting unit connected to the network and configured to transmit a pseudo-wakeup signal to the network during at least one idle period of the communication cycle to wake up the second node from the sleep state after the un-wakeup-node detecting unit detects that the second node remains in the sleep state; and
    a network-idle-time detection circuit configured to detect the idle period by measuring a time elapsing after a start of the communication cycle to a predetermined start time of the idle period of the communication cycle.

2. The communication network system according to claim 1, further comprising:
    an idle-period detecting unit configured to detect each idle period in the communication cycle.

3. The communication network system according to claim 2 wherein the pseudo-wakeup-signal transmitting unit is further configured to transmit the pseudo-wakeup signal when the idle-period detecting unit detects a first idle period after the un-wakeup-node detecting unit detects that the second node remains in the sleep state.

4. The communication network system according to claim 3, further comprising:
    a predetermined start time of each idle period in the communication cycle; and wherein the idle-period detecting unit is further configured to detect the first idle period when a time elapsing after a start of the communication cycle after the un-wakeup-node detecting unit detects that the second node remains in the sleep state is equal to the predetermined start time.

5. The communication network system according to claim 2, further comprising:
    a predetermined start time of the idle period in the communication cycle; and
    wherein the idle-period detecting unit is further configured to detect each idle period by measuring a time elapsing after a start of the communication cycle.

6. The communication network system according to claim 1 wherein the un-wakeup-node is further configured to detect the second node remains in the sleep state following transmission of the wakeup signal by monitoring whether data is received from the second node in the data transfer period.

7. The communication network system according to claim 1 wherein the un-wakeup-node detecting unit further comprises:
    memory for storing information regarding the plurality of nodes; and wherein the un-wakeup-node is further configured to detect which of the plurality of nodes remains in the sleep state following transmission of the wakeup signal by comparing the information to whether data is received from each of the plurality of nodes in the data transfer period.

8. The communication network system according to claim 1 wherein the pseudo-wakeup-signal transmitting unit is further configured to transmit the pseudo-wakeup signal during only a predetermined number of communication cycles even if the un-wakeup-node detecting unit continues to detect that the second node remains in the sleep state.

9. The communication network system according to claim 1 wherein the pseudo-wakeup-signal transmitting unit is further configured to transmit the pseudo-wakeup signal during a predetermined number of communication cycles until the second node wakes up from the sleep state.

10. The communication network system according to claim 1 wherein each of the plurality of nodes woken up by the wakeup signal from the first node is configured to remain unresponsive to receipt of the pseudo-wakeup signal.

11. The communication network system according to claim 1 wherein the communication network is FlexRay communication protocol performing time-division-multiplexing communication in the communication cycle having the data transfer period and the idle period.

12. The communication network in claim 1 wherein a central processing unit of the first node is configured to prevent processing over the network during transmission of the pseudo-wakeup signal to the network; and wherein the pseudo-wakeup signal is transmitted from the first node.

13. The communication network in claim 1 wherein the pseudo-wakeup signal is the same as the wakeup signal.

14. A communication network system for performing time-division-multiplexing communication in a communication cycle including a data transfer period and an idle period, the communication network system comprising:
    network means for communication among a plurality of nodes using the communication cycle, each communication cycle being a periodic cycle including the data transfer period and the idle period;
    means for transmitting a wakeup signal over the network means from one node to at least two nodes;
    means for detecting an un-wakeup node that remains asleep after the one node transmits the wakeup signal over the network means;
    means for starting the communication cycle after at least one node of the at least two nodes wakes up in response to the wakeup signal;
    means for detecting each idle period of the communication cycle; and
    means for transmitting a pseudo-wakeup signal in a first idle period detected by the means for detecting each idle period after the un-wakeup node is detected, wherein the network means comprises a FlexRay communication protocol performing the time-division-multiplexing communication in the communication cycle having the data transfer period and the idle period.

15. A vehicle including the communication network system according to claim 14.

16. A method for waking up a communication network from a sleep state, the communication network for performing time-division-multiplexing communication in a communication cycle, the communication network having a plurality of nodes including a first node transmitting a wakeup signal to the communication network after awaking from the sleep state, the method comprising:
    transmitting the communication cycle between the first node and at least one node of the communication network in a communicating state after having received the wakeup signal from the first node, the communication cycle being a periodic cycle having at least one data transfer period followed by an idle period;
    detecting an unwakeup state of any node remaining in a sleep state after having received the wakeup signal from the first node;
    transmitting a pseudo-wakeup signal within at least one idle period in the communication cycle to change the sleep state of a node remaining in the sleep state to the communicating state; and
    detecting the idle period by measuring a time elapsing after a start of the communication cycle to a predetermined start time of the idle period of the communication cycle.

17. The method according to claim 16 wherein detecting the unwakeup state of any node comprises detecting whether each of the nodes of the communication network transmits data during a data transfer period of the communication cycle.

18. The method according to claim 16, further comprising:
    limiting a number of pseudo-wakeup signals sent when any node remains in the sleep state.

19. The method according to claim 16, further comprising:
    storing information regarding each of the nodes of the communication network; and wherein detecting the unwakeup state of any node comprises monitoring which of the nodes does not transmit data in a data transfer period of the communication cycle.

* * * * *